(12) United States Patent
Puttaiah et al.

(10) Patent No.: US 10,124,747 B2
(45) Date of Patent: Nov. 13, 2018

(54) HVAC CONDENSER CONDENSATE DEFLECTOR THAT DEFLECTS AND CHANNELS THE HVAC CONDENSATE

(71) Applicant: FORD GLOBAL TECHNOLOGIES, LLC, Dearborn, MI (US)

(72) Inventors: Raghu Puttaiah, Troy, MI (US); Bryn Arthur Davies, Novi, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 789 days.

(21) Appl. No.: 14/595,633

(22) Filed: Jan. 13, 2015

(65) Prior Publication Data

US 2016/0200267 A1    Jul. 14, 2016

(51) Int. Cl.
*B60R 13/07* (2006.01)
*B60R 13/08* (2006.01)
(Continued)

(52) U.S. Cl.
CPC .......... *B60R 13/07* (2013.01); *B60H 1/3233* (2013.01); *B60R 13/0838* (2013.01); *B60H 2001/006* (2013.01)

(58) Field of Classification Search
CPC ... B60R 13/07; B60R 13/0838; B60H 1/0055; B60H 1/3233; B60H 2001/006; B60H 2001/2287
See application file for complete search history.

(56) References Cited

U.S. PATENT DOCUMENTS 5,965,851 A    10/1999 Herreman et al.

6,351,962 B1 *    3/2002 Mizutani ............ B60H 1/00528
180/90
(Continued)

FOREIGN PATENT DOCUMENTS

CN    203306105 U    11/2013
EP    1365388 A1    11/2003
(Continued)

OTHER PUBLICATIONS

A. B. Deshmukh, S.V.Chaitanya, Sachin Wagh Case Study on Sandwich steel Application in Automotive BIW for NVH Improvements IOSR Journal of Mechanical and Civil Engineering (IOSR-JMCE) ISSN(e) : 2278-1684, ISSN(p) : 2320-334X, pp. 01-06 www.iosrjournals.org.
(Continued)

*Primary Examiner* — Jeremy A Luks
(74) *Attorney, Agent, or Firm* — Vichit Chea; King & Schickli PLLC

(57) ABSTRACT

An acoustic barrier panel for reducing transmission of sound between a motor vehicle engine compartment and a motor vehicle passenger compartment includes an integral motor vehicle heating, ventilating, and air conditioning (HVAC) unit condensate deflector. The HVAC unit condensate deflector may be defined in a material of the acoustic barrier panel. The HVAC unit condensate deflector may include a condensate reservoir portion in fluid communication with a condensate drainage channel portion. The condensate reservoir portion and the condensate drainage portion may include at least one interior layer formed of a hydrophobic material. By the integral HVAC condensate deflector, condensate draining from a motor vehicle HVAC unit is deflected whereby contact with an exhaust system of the motor vehicle is avoided.

11 Claims, 5 Drawing Sheets

(51) Int. Cl.
*B60H 1/00* (2006.01)
*B60H 1/32* (2006.01)

(56) References Cited

U.S. PATENT DOCUMENTS

| | | | |
|---|---|---|---|
| 6,422,301 B1 * | 7/2002 | Scoccia | B60H 1/3233 |
| | | | 165/42 |
| 6,478,083 B1 * | 11/2002 | Nanba | B60H 1/00514 |
| | | | 165/202 |
| 6,776,444 B2 * | 8/2004 | Berteaux | B62D 25/14 |
| | | | 180/90 |
| 7,070,848 B2 | 7/2006 | Campbell | |
| 7,770,692 B2 | 8/2010 | Hazelton et al. | |
| 8,997,837 B2 * | 4/2015 | Kakizaki | B60H 1/00064 |
| | | | 165/42 |
| 2013/0134735 A1 | 5/2013 | Shives et al. | |

FOREIGN PATENT DOCUMENTS

| | | | | |
|---|---|---|---|---|
| JP | 59223515 A | * | 12/1984 | ........... B60H 1/3233 |
| JP | 61282733 A | * | 12/1986 | ........... B60H 1/3233 |
| JP | 2005170303 A | * | 6/2005 | ......... B60H 1/00028 |

OTHER PUBLICATIONS

English machine translation of CN203306105U.

* cited by examiner

HVAC CONDENSER CONDENSATE DEFLECTOR THAT DEFLECTS AND CHANNELS THE HVAC CONDENSATE

TECHNICAL FIELD

This disclosure relates generally to motor vehicle heating, ventilating, and air conditioning (HVAC) units. In particular, the disclosure relates to an acoustic barrier for a motor vehicle including an integral HVAC condensate deflector.

BACKGROUND

It is known that HVAC units for motor vehicles generate condensate, created by latent water vapor present in the air which is heated or cooled according to user preference and transferred into the motor vehicle passenger compartment. Typically, HVAC condensate is simply drained via an HVAC drain tube from the HVAC unit onto the ground beneath the vehicle. However, simply draining the condensate in this fashion creates a problem in that the condensate may contact components of the motor vehicle exhaust. In addition to potential moisture damage to the exhaust components, the condensate is much cooler than the hot exhaust components, creating a displeasing sizzling sound that may be objectionable to the consumer, or may lead the consumer to incorrectly believe that the vehicle has a mechanical problem.

Conventional solutions include providing add-on extensions or diverters to the HVAC unit drain tube, to re-route the condensate away from exhaust componentry. However, parts such as drain tube extensions or diverters also require heat protection, to prevent the parts from melting under the intense heat generated by the motor vehicle engine. For this reason, any add-on extensions or diverters must be fabricated of heat resistant materials, or be otherwise shielded from engine heat to prevent melting/damage. Such conventional solutions add complexity and cost.

To solve this and other problems, the present disclosure describes an acoustic barrier including an integral HVAC condensate deflector which deflects condensate generated by the motor vehicle HVAC unit. This prevents unwanted contact of the condensate with, for example, components of the motor vehicle exhaust system. Conveniently, the acoustic barrier is already fabricated to include heat-resistant materials, thus avoiding any need for additional devices for preventing heat damage to the deflector.

SUMMARY

In accordance with the purposes and benefits described herein, in one aspect an acoustic barrier for reducing transmission of sound between a motor vehicle engine compartment and a motor vehicle passenger compartment is provided. The acoustic barrier comprises a panel including at least a sound-absorbing material layer. In addition, the acoustic barrier panel includes an integral motor vehicle heating, ventilating, and air conditioning (HVAC) unit condensate deflector to deflect HVAC condensate to an exterior of the motor vehicle engine compartment. In embodiments, the HVAC unit condensate deflector configuration is molded into a material of the acoustic barrier panel, and may include a condensate reservoir portion in fluid communication with a condensate drainage channel portion. Typically, the acoustic barrier panel is formed of and/or coated with one or more layers of heat-resistant materials as are known in the art. In an embodiment, the condensate reservoir portion and the condensate drainage portion may include at least one interior layer formed of a hydrophobic material In another aspect, a heating, ventilating, and air conditioning (HVAC) system for a motor vehicle is provided including a motor vehicle HVAC unit including a condensate drain and an acoustic barrier as described above. The HVAC unit condensate deflector is disposed in the acoustic barrier to prevent condensate from contacting an exhaust assembly of the motor vehicle.

In yet another aspect, a method for diverting a heating, ventilating, and air conditioning (HVAC) unit condensate from contacting an exhaust assembly of a motor vehicle is described. The method includes providing an acoustic barrier for reducing transmission of sound between an engine compartment and a passenger compartment of the motor vehicle, the acoustic barrier including an integral HVAC unit condensate deflector as described above, the integral condensate deflector being disposed to prevent condensate from contacting an exhaust assembly of the motor vehicle.

In the following description, there are shown and described embodiments of the disclosed acoustic barrier including an HVAC condensate diverter for use in a motor vehicle. As it should be realized, the device is capable of other, different embodiments and its several details are capable of modification in various, obvious aspects all without departing from the device as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed acoustic barrier including an HVAC condensate diverter, and together with the description serve to explain certain principles thereof. In the drawing.

Reference will now be made in detail to embodiments of the disclosed acoustic barrier including an HVAC condensate diverter, examples of which are illustrated in the accompanying drawing figures.

DETAILED DESCRIPTION

As is known, modern motor vehicles are nearly universally equipped with an acoustic barrier disposed between an engine compartment and a passenger compartment of the vehicle. These acoustic barriers are panels formed of and/or coated with various sound absorbing materials, to dampen the sound produced by the motor vehicle engine and so reduce the engine noise experienced by the motor vehicle operator. Because the acoustic barrier panels are typically disposed between the motor vehicle engine compartment and the passenger compartment, they must also be formed of and/or coated with heat-resistant materials, to prevent damage from heat generated by the engine.

As is also known, modern motor vehicles are nearly universally equipped with onboard heating, ventilation, and air conditioning (HVAC) systems for maintaining the interior of the passenger compartment of the motor vehicle at a user-designated temperature. Vehicle HVAC units are typically disposed in an engine compartment of the motor vehicle, and utilize elements of the motor vehicle engine and electrical system to operate. At a high level, the motor vehicle HVAC unit selectively takes in air from either an exterior of the motor vehicle or an interior of the motor vehicle passenger compartment, heat or cool that air as required by the motor vehicle operator, and introduce the heated or cooled air into the passenger compartment by way of a ventilation system. During the process of heating/cooling air, latent water vapor is condensed from the air, creating a condensate which must be disposed of. In the case of commercial or residential HVAC units intended for use in a building, the condensate is collected in a condensate pan and drained by a pump. This would be impractical for a motor vehicle. Instead, because the condensate is nothing more than harmless water, it can safely be disposed of by simply allowing it to drain away from the vehicle onto the ground.

Figure 1:
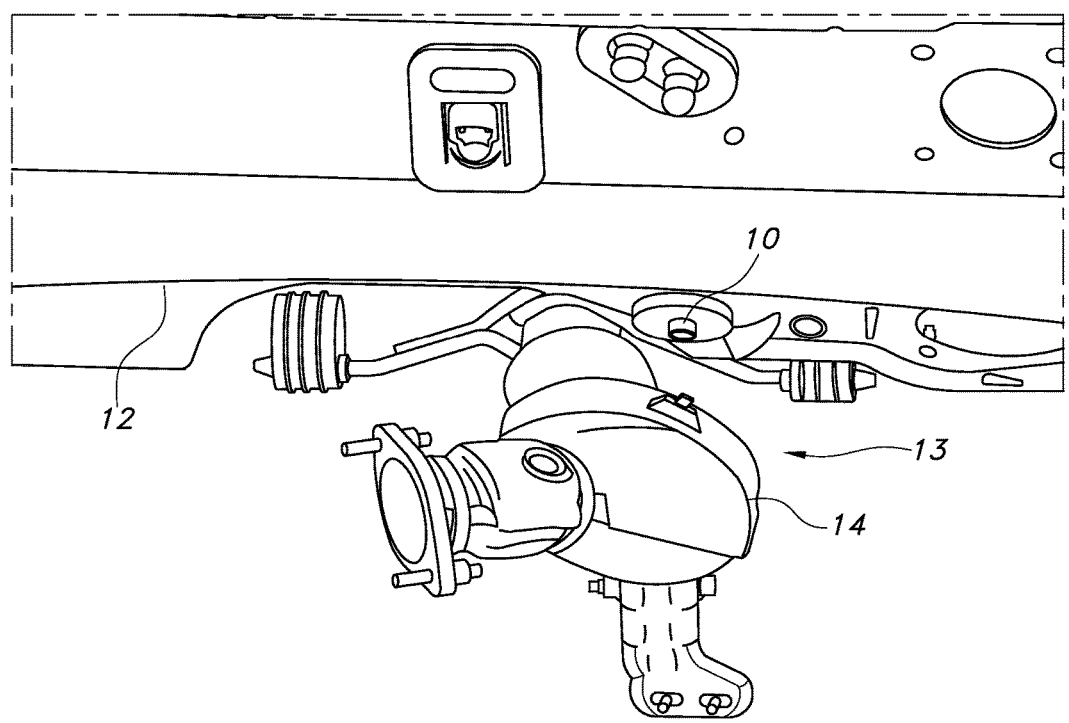
FIG. 1 depicts a portion of a motor vehicle dash/cowl assembly including an acoustic barrier panel and an HVAC drain outlet passing therethrough.

With reference to FIG. 1, this is most often done by providing an HVAC drain tube 10 passing through a dash/cowl assembly including an acoustic barrier 12 of the motor vehicle, to allow the condensate to drain out to an exterior of the vehicle. However, as noted above, this often results in condensate undesirably draining onto components of the motor vehicle exhaust system 13, such as the catalytic converter 14, the exhaust pipe (not shown), and others. This contact of a cooler condensate with a hot exhaust system component creates an unpleasant sizzling sound, and further over time may result in oxidation and other damage to the exhaust system components.

Figure 2:
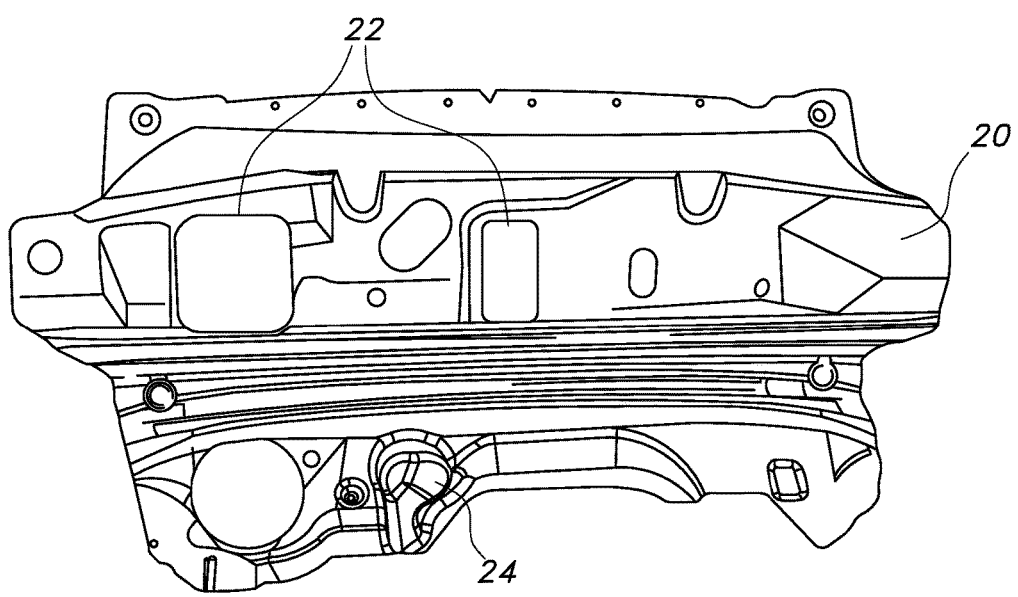
FIG. 2 depicts an acoustic barrier panel according to the present disclosure.

To solve this problem, with reference to FIG. 2 an acoustic barrier panel 20 is provided. The panel 20 includes various cutout portions 22 for accommodating other elements of a motor vehicle, for example the steering column, various ducts, etc. As is known for such panels, the acoustic barrier panel 20 may be molded as a unit of various thermoplastic, acoustically insulating materials, for example polymers such as PET blended with fiberglass fibers. Of course, multiple other materials and blends of materials are known to the skilled artisan for fabricating such acoustically insulating panels, and are contemplated for use herein.

In addition, the acoustic barrier panel 20 includes an integral condensate deflector 24 defined in a portion of the material of the acoustic barrier panel 20. In one embodiment, the integral condensate deflector 24 is provided as a molded-in element of the acoustic barrier panel 20 during the molding process used to fabricate the panel 20.

Figure 3:
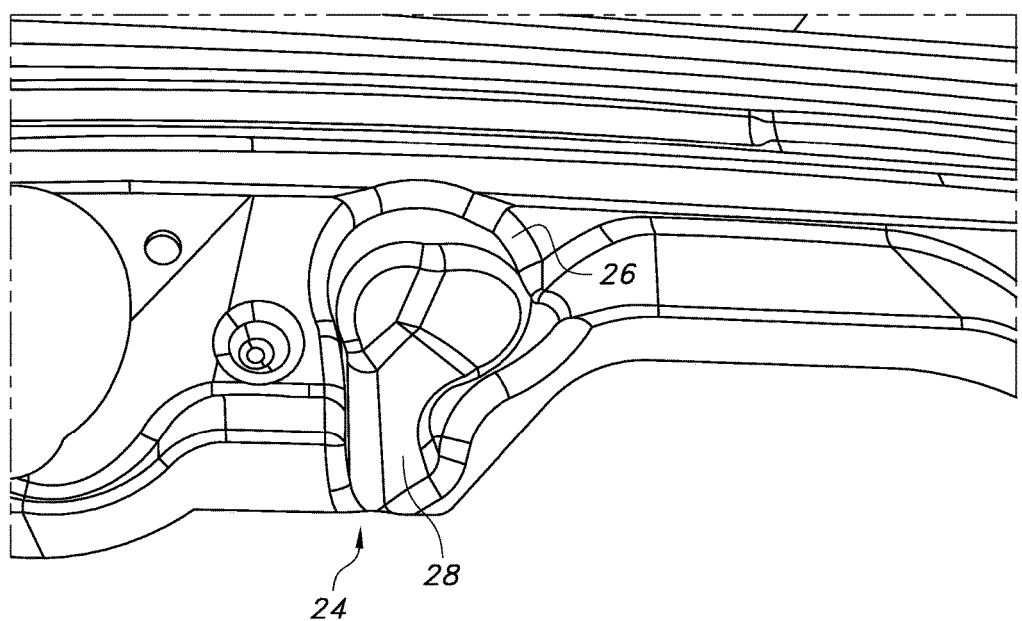
FIG. 3 shows an HVAC condensate deflector defined in an acoustic barrier panel according to the present disclosure.

In embodiments, the integral condensate deflector 24 defines a condensate reservoir portion 26 and a condensate drainage channel portion 28 (see FIG. 3). The interior of the condensate reservoir portion 26 and a condensate drainage channel portion 28, that is, the surfaces of these structures that are contacted by condensate draining from HVAC drain tube 10 (not shown in this view), may be lined, coated, covered, or fabricated of suitable hydrophobic materials. This prevents moisture from soaking into the acoustically insulating material of the acoustic barrier panel 20, which may eventually degrade the insulating material. Likewise, a suitable heat resistant material such as aluminum foil or others may be included in or on a surface of the integral condensate deflector 24, to protect the HVAC drain tube 10 from motor vehicle engine heat. As will be appreciated, in embodiments the heat resistant material may be disposed on a surface of the integral condensate deflector 24 opposite to the surface having the hydrophobic material.

Figure 4:
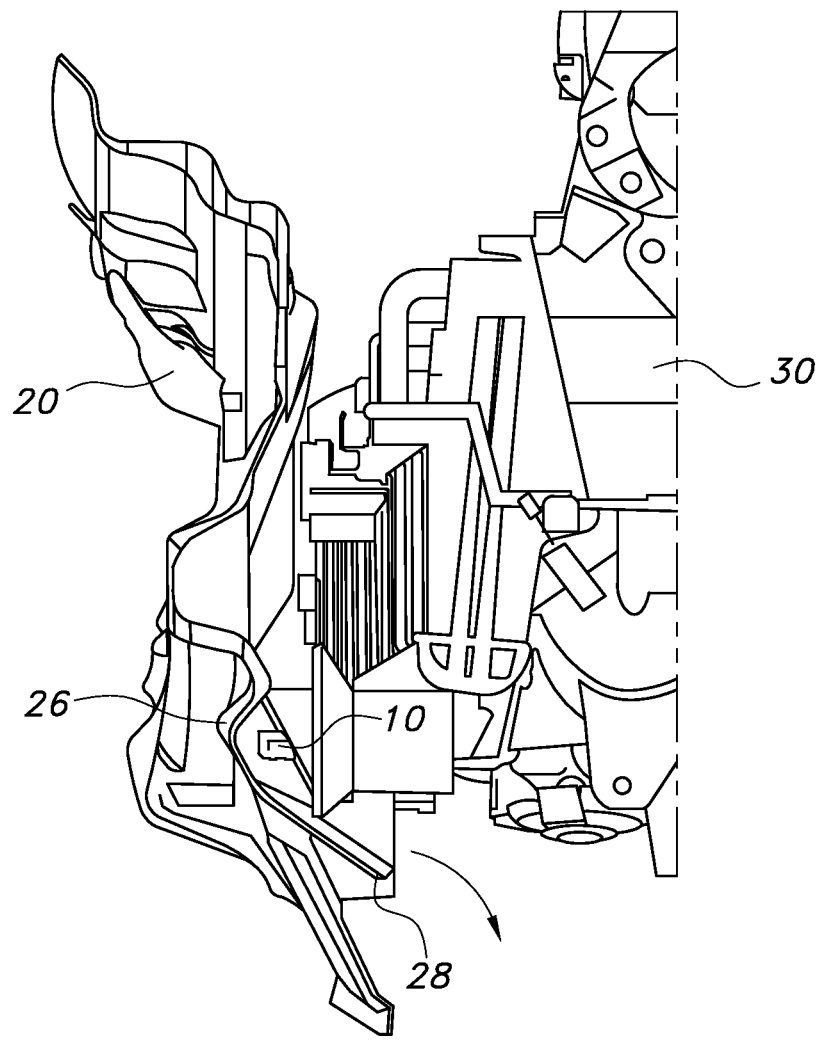
FIG. 4 shows the HVAC condensate deflector of FIG. 2 assembled in a motor vehicle to deflect condensate from an HVAC drain outlet.
Figure 5:
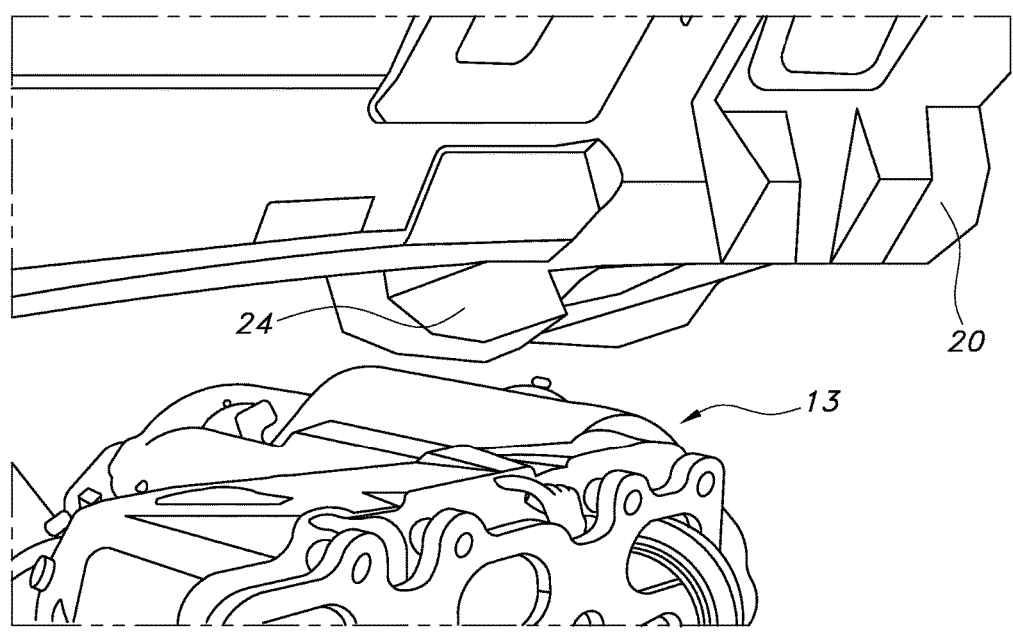
FIG. 5 shows the assembly of FIG. 4 deflecting condensate away from a motor vehicle exhaust system.

As shown in FIG. 4, in a motor vehicle (not shown) having the acoustic barrier panel 20 interposed between an engine compartment 30 and a passenger compartment (not shown) of the vehicle, the integral condensate deflector 24 defined in the acoustic barrier panel 20 is disposed to receive and divert condensate exiting the HVAC drain tube 10. The condensate is diverted to exit the motor vehicle engine compartment and drain to the ground (see arrow), without contacting elements of the motor vehicle exhaust system 13 (see FIG. 5).

The foregoing disclosure has been presented for purposes of illustration and description. It is not intended to be exhaustive or to limit the embodiments to the precise form disclosed. Obvious modifications and variations are possible in light of the above teachings, and all such modifications and variations are within the scope of the appended claims when interpreted in accordance with the breadth to which they are fairly, legally and equitably entitled.

What is claimed:

1. An acoustic barrier for reducing transmission of sound between a motor vehicle engine compartment and a motor vehicle passenger compartment, the acoustic barrier comprising a panel including at least a sound-absorbing material layer;

further wherein the acoustic barrier panel includes an integral motor vehicle heating, ventilating, and air conditioning (HVAC) unit condensate deflector defined in the acoustic barrier panel as a condensate reservoir portion in fluid communication with a condensate drainage channel portion.

2. The acoustic barrier of claim 1, wherein the condensate reservoir portion and the condensate drainage portion include at least one interior layer formed of a hydrophobic material.

3. The acoustic barrier of claim 2, wherein the condensate drainage channel portion diverts an HVAC unit condensate to an exterior of the motor vehicle engine compartment whereby the condensate does not contact an exhaust assembly of the motor vehicle.

4. A motor vehicle including the acoustic barrier of claim 1.

5. A heating, ventilating, and air conditioning (HVAC) system for a motor vehicle, comprising:
a motor vehicle HVAC unit including a condensate drain; and
an acoustic barrier for reducing transmission of sound between an engine compartment and a passenger compartment of the motor vehicle, the acoustic barrier including an integral HVAC unit condensate deflector defined in the acoustic barrier and disposed to deflect condensate exiting the drain;
wherein the HVAC unit condensate deflector includes a condensate reservoir portion in fluid communication with a condensate drainage channel portion.

6. The HVAC system of claim 5, wherein the condensate reservoir portion and the condensate drainage portion include at least one interior layer formed of a hydrophobic material.

7. The HVAC system of claim 5, wherein the condensate drainage channel portion diverts an HVAC unit condensate to an exterior of the motor vehicle engine compartment whereby the condensate does not contact an exhaust assembly of the motor vehicle.

8. A motor vehicle including the HVAC system of claim 7.

9. In a motor vehicle, a method for diverting a heating, ventilating, and air conditioning (HVAC) unit condensate from contacting an exhaust assembly of the motor vehicle, comprising providing an acoustic barrier for reducing transmission of sound between an engine compartment and a passenger compartment of the motor vehicle, the acoustic barrier including an integral HVAC unit condensate deflector defined in the acoustic barrier;
- wherein the integral HVAC unit condensate deflector is disposed to deflect condensate exiting an HVAC unit condensate drain to prevent condensate contact with the exhaust assembly;
- further wherein the HVAC unit condensate deflector is provided including a condensate reservoir portion in fluid communication with a condensate drainage channel portion.

10. The method of claim 9, including providing the condensate reservoir portion and the condensate drainage portion including at least one interior layer formed of a hydrophobic material.

11. The method of claim 9, including providing the condensate drainage channel portion configured to divert the condensate to an exterior of the motor vehicle engine compartment whereby the condensate does not contact an exhaust assembly of the motor vehicle.

* * * * *